US008303460B2

(12) United States Patent
Jurjanz

(10) Patent No.: US 8,303,460 B2
(45) Date of Patent: Nov. 6, 2012

(54) CONNECTION OF SHEET METAL COMPONENTS OF A TRANSMISSION

(75) Inventor: Ramon Jurjanz, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1027 days.

(21) Appl. No.: 12/297,709

(22) PCT Filed: Apr. 3, 2007

(86) PCT No.: PCT/EP2007/053211
§ 371 (c)(1),
(2), (4) Date: Nov. 5, 2008

(87) PCT Pub. No.: WO2007/122078
PCT Pub. Date: Nov. 1, 2007

(65) Prior Publication Data
US 2009/0105034 A1 Apr. 23, 2009

(30) Foreign Application Priority Data
Apr. 21, 2006 (DE) .......................... 10 2006 018 496

(51) Int. Cl.
*F16H 57/08* (2006.01)
(52) U.S. Cl. ...................................... 475/331; 74/606 R
(58) Field of Classification Search .................. 403/242, 403/274, 276–283; 74/606 R; 475/331
See application file for complete search history.

(56) References Cited

U.S. PATENT DOCUMENTS

| 3,387,481 | A | | 6/1968 | Harvey et al. | |
| 4,617,839 | A | * | 10/1986 | Matoba | 475/335 |
| 4,793,214 | A | * | 12/1988 | Nurnberger et al. | 475/331 |
| 6,502,295 | B1 | * | 1/2003 | Morgand | 29/509 |
| 6,918,170 | B2 | * | 7/2005 | Luthi | 29/509 |
| 7,996,977 | B2 | * | 8/2011 | Herb | 29/432.2 |

FOREIGN PATENT DOCUMENTS

| DE | 26 52 652 | | 5/1978 |
| DE | 36 37 299 | A | 5/1987 |
| DE | 85 32 139 | A | 5/1987 |
| DE | 35 42 622 | A | 6/1987 |
| DE | 100 27 422 | Y | 6/2002 |
| DE | 103 14 544 | | 10/2004 |
| DE | 103 34 459 | Y | 3/2005 |
| EP | 08 35 700 | | 4/1998 |
| FR | 2 652 137 | A | 3/1991 |
| FR | 27 52 886 | | 3/1998 |
| WO | 01/94 797 | | 12/2001 |
| WO | 2004/098810 | Y | 11/2004 |

* cited by examiner

*Primary Examiner* — Justin Holmes
(74) *Attorney, Agent, or Firm* — Lucas & Mercanti, LLP; Klaus P. Stoffel

(57) ABSTRACT

The invention relates to a connection of sheet metal components of a transmission, wherein the connection has at least one form fit between at least one first sheet metal component and at least one second sheet metal component, and here, the form fit is formed by means of at least one journal which projects out of the first sheet metal component, wherein the journal engages into an opening, which at least partially corresponds to the outer contour of the journal, on the second sheet metal component.

13 Claims, 2 Drawing Sheets

|   | min. | max. |
|---|---|---|
|   | 0.5g | 1.5g |
| f | 0.75e | 1.5e |
|   | 1.8a | 8.0a |
| g | 0.3d | 0.9d |
| e |   | 10c |
| c | 0.1e | 0.9e |
| d | 0.1e | 0.9e |
| a | 0.2e | 0.8e |
| b | 0.5e | 1.0e |

Fig. 2

CONNECTION OF SHEET METAL COMPONENTS OF A TRANSMISSION

FIELD OF THE INVENTION

This application is a 371 of PCT/EP2007/053211 filed Apr. 3, 2007, which in turn claims the priority of DE 10 2006 018496.3 filed Apr. 21, 2006, the priority of both applications is hereby claimed and both applications are incorporated by reference herein.

The invention relates to a connection of sheet metal components of a transmission, the connection having at least one form fit between at least one first sheet metal component and at least one second sheet metal component, and at the same time the form fit being formed by means of at least one tenon projecting out of the first sheet metal component, the tenon engaging into an orifice on the second sheet metal component, said orifice at least partially matching the outer contour of the tenon. The invention relates, further, to a transmission having a connection of this type.

BACKGROUND OF THE INVENTION

Connections of this type are described in DE 26 52 652 A1. The form fit ensures that components rotating jointly about an axis of rotation are secured one to the other fixedly in terms of torque. In other cases, a connection of this type ensures that the parts do not twist with respect to one another or move with respect to one another in any other way. The last-mentioned case is described in DE 26 52 652 A1. A securing sheet for securing a planet bolt is additionally secured to the planet carrier by means of a bushing of the sheet of the planet carrier. Bushings of this type are produced by pressing or punch-pressing.

In the cases where high torques have to be transmitted between two sheet metal components of a transmission which are connected to one another, the sheet metal components are often connected to one another by means of welded joints or by means of rivets. The heat introduced during the welding often leads to unwanted deformations of the transmission components. Riveting is therefore frequently adopted. The rivets, for example in planetary drives, are placed between the planet bolt. Often, however, there is little axial and radial construction space available for the heads of the rivets. The dimensions of the transmission then have to be made correspondingly large so that rivets adapted to the torques to be transmitted can be introduced.

SUMMARY OF THE INVENTION

The object of the invention, therefore, is to provide a connection of sheet metal components of a transmission and a transmission having a connection of this type, which has a space-saving design and via which high torques can be transmitted between the components connected to one another.

This object is achieved, according to the subject matter of the characterizing part of claim 1, in that the tenon bushed out of the first component engages into an orifice of the second sheet metal component or through this orifice, and at the same time the tenon engages behind the second sheet metal component at least at an undercut. The undercut is formed materially integrally with the material of the sheet of the second sheet metal component. The first and the second sheet metal component are connected unreleasably to one another by means of the tenon engaging behind the undercut. The sheet metal components are riveted to one another due to the bushing of their own material, without the aid of a rivet as the conventional connection means. For this purpose, at the margin of the free end of the tenon, material is folded round radially outward by pressing, tumbling, punching or bending, such that said material engages behind the undercut. Material can be displaced out of the tenon onto the undercut in a simple way if the tenon is hollow on the inside. The undercut on the second component either is produced before the mounting of the sheet metal components one onto the other and therefore before the connection is made or, as provided in an embodiment of the invention, is formed by the displacement of material out of the second sheet metal component while the rivet connection is being made. The undercut either is formed directly in the orifice or is that margin of the orifice of a through-hole which faces away from the first sheet metal component.

The tenon is preferably bushed out of a wall portion of the first sheet metal component, so that a depression is formed in the first sheet metal component on the rear side of the tenon on that side which faces away from the second sheet metal component. The die of the tool required for producing the tenon is preferably externally cylindrical. Hence, the tenon is cylindrical on the outside, and the depression produced as a result of the displacement of the material is cylindrical on the inside. The volume of the tenon corresponds to the material displaced out of the depression.

Preferably, the sheet metal components are fastened to one another by means of two or more of the connections according to the invention. Moreover, combinations of the connections according to the invention with connections known hitherto, such as with the classic connection by means of rivets or such as with screw connections, are combined with one another. The dimensions of the individual connections are adapted to the proportions arising from the maximum loads. The maximum loads on the components are distributed proportionately to the individual connections, depending on position and implementation. It is conceivable that, in the overall connection, individual connections of the same type are dimensionally identical or differ from one another in the dimensions.

In an embodiment of the invention, the connection is a bushed rivet connection which results from the bushing and plastic deformation of material out of the sheet metal components lying one against the other. For this purpose, in an initial state, the second sheet metal component has on a predetermined portion a through-hole which subsequently forms the orifice. A portion of the first sheet metal component then initially lies flat on the portion and is optionally also provided with a through-hole. The through-holes in this case have as common axis of symmetry the subsequent axis of symmetry of the tenon. Finally, the tenon and, at the same time, the rivet connection is produced by means of a die or dies. The depression has an internal shape which corresponds to the external shape of the die by means of which the tenon has been displaced out of the first sheet metal component.

In the bushed rivet connection, the tenon has a volume which corresponds essentially to the volume of the material displaced out of the depression. The tenon is expanded on the end face in the rivet connection such that the radial outer dimensions of the tenon are larger than the narrowest cross section in the orifice on the undercut.

The undercut has a shape which arises from the dimensions of a mold on which the second sheet metal component was supported during riveting, from the dimensions of the dye, from the ratio of the abovementioned dimensions to one another and from the forming forces. The contour of the undercut is formed from the material of the second sheet metal component which, during the forming and simultaneous end-face deformation of the tenon, was deformed plastically together with the material of the first sheet metal component or by the material displaced out of the first sheet metal component. Moreover, the contour of the undercut is determined by the material which is curved radially outward from the tenon and engages behind the undercut.

The connection was designed by computer by means of the finite element method and was tested in trials. In this case, special attention was given to the cross sections of the material, by virtue of which the tenon and the first sheet metal component are not separated from one another completely after the bushing of the tenon and which therefore still connects the first sheet metal component to the tenon in a materially integral manner after the bushing of the material.

The design of the rivet connection therefore took into account not only the properties of the material from which the sheet metal components are formed and not only the forming technology rules, but also variables which are listed below and are illustrated by an exemplary embodiment according to FIG. 1 and which, inter alia, also have an influence on the strength of this abovementioned cross section:

f is the inside diameter of the depression
g is the depression depth codirectional with the axis of symmetry of the tenon
e is the overall wall thickness, codirectional with the axis of symmetry of the tenon, of the sheet metal components lying one against the other at the connection
d is the wall thickness of the first sheet metal component at the connection
c is the wall thickness of the second sheet metal component at the connection
a is the narrowest cross section of a possible through-hole in the tenon
b is the largest radial outer dimension of an axial bulging at the orifice of the second sheet metal component and therefore at the same time the inside diameter of the mold on which the second sheet metal component was supported while the bushed rivet connection was being made.

Further embodiments of the invention are structurally and computationally determined dependencies of the abovementioned variables on one another and are collated in a table in FIG. 2.

The invention provides a rivet connection which has an extremely space-saving design and requires little or no axial construction space. The rivet, as a classic connection element, can therefore be dispensed with as a component. The rivet connection can be made in a simple way during the mounting of the transmission components and is therefore cost-effective. This rivet connection can also be used on sheet metal components having a relatively large wall thickness. The radial dimensions of the rivet connection are small, and therefore this can be arranged even at locations where the heads of conventional rivets would cause disturbance on account of their dimensions.

DESCRIPTION OF THE DRAWINGS

FIG. 2 is a table showing variables with minimum and maximum ranges.

FIG. 1 shows a partial view of a transmission 1 designed as an epicyclic transmission. The planet carrier, designated as the second sheet metal component 2, is connected to a first sheet metal component 3 which has on the outside a toothing 4 or indentations for clutch lamellae. The sheet metal components 2 and 3 are connected to one another by means of connections according to the invention and further connections, of which an exemplary embodiment of a connection 5 is illustrated in the drawing. The connection 5 is a positive connection of the sheet metal components 2 and 3 with non-positive portions. For this purpose, a tenon 6 projects axially from the first sheet metal component 3. The axis of symmetry 7 of the tenon 6 runs parallel to the axis of rotation 8 of the epicyclic transmission. An orifice 9 is formed in the second sheet metal component 2. The orifice 9 has an undercut 10 which is delimited by the flank 11 and which ends at an annular edge 12. The annular edge 12 delimits the narrowest cross section of the orifice 9. The flank 11 is selectively an envelope of an inner cone or curved. The diameter of the orifice 9 increases toward the first sheet metal component 2. The orifice is filled in this region by an externally conical portion 13 of the tenon. The portion 13 is optionally curved in any direction. A bead 14 engages behind the undercut 10 at the flank 11. The bead 14 is formed plastically, and therefore prestressed, in an axial direction against the flank 11, since the tenon is supported in the other axial direction in the orifice 9 by the portion 13.

Figure 1:
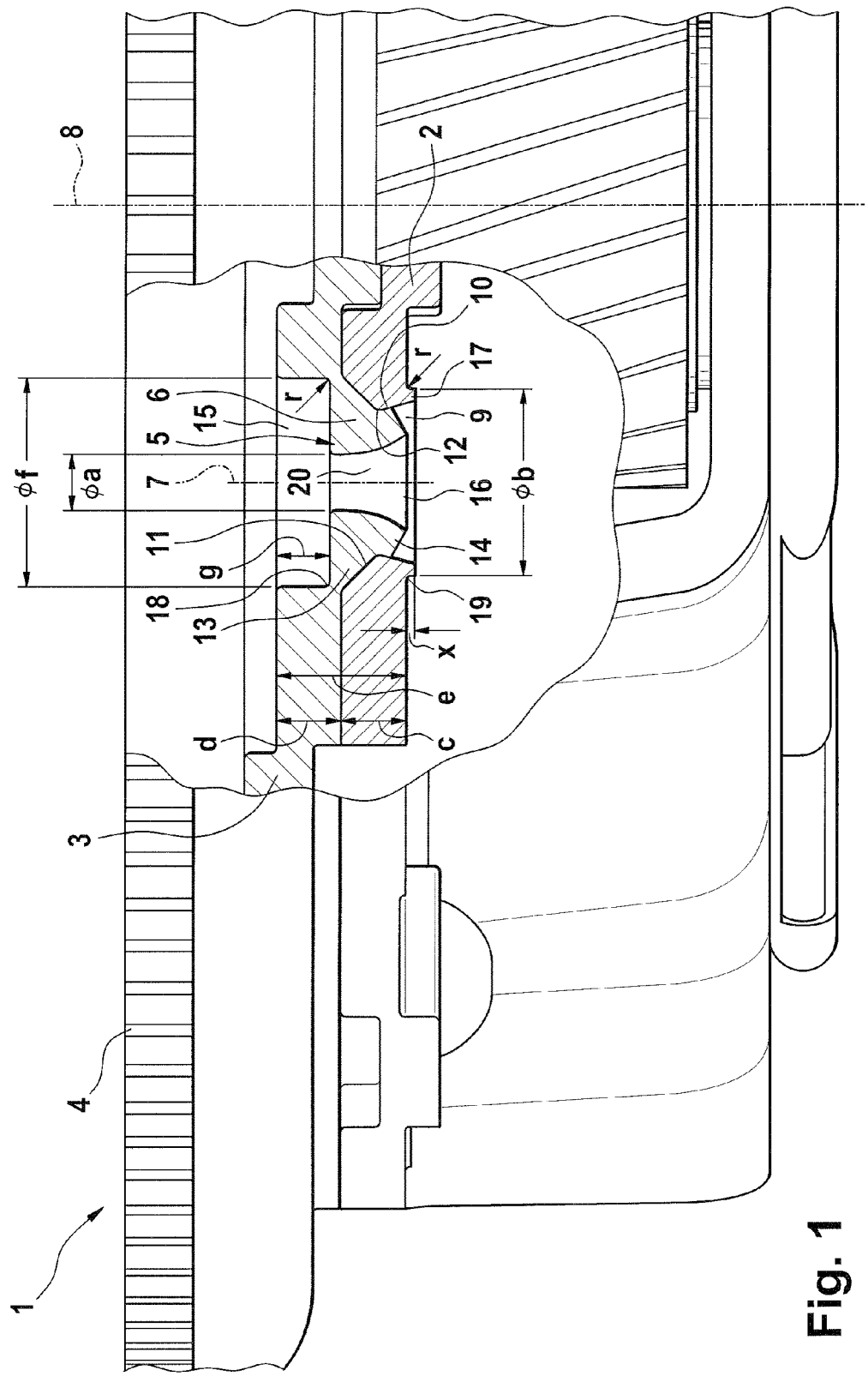
FIG. 1 is a partial broken-out view of a transmission.

A depression 15 adjoins the tenon 6 on the rear side. The depression 15 is of internally hollow-cylindrical design and has essentially the volume of the tenon 6 projecting axially out of the first component 2. The tenon 6 has a through-hole 20 which widens in the direction of the free end 16 of the tenon and which merges in the opposite direction into the depression 15.

An axial bulging 17 projects from the second sheet metal component 3. The bulging is formed by material of the second sheet metal component 3 which, while the bushed rivet connection is being made, was displaced out of the orifice 9 by means of the material of the tenon 6 in order to form the undercut 10. The annular inner edge 18 in the depression and the annular outer edge 19 on the bulging are provided with a radius r which preferably has a dimension of 0.05 mm to 2 mm.

LIST OF REFERENCE NUMERALS

1 Transmission
2 Second sheet metal component
3 First sheet metal component
4 Toothing
5 Connection
6 Tenon
7 Axis of symmetry
8 Axis of rotation
9 Orifice
10 Undercut
11 Flank
12 Annular edge
13 Portion
14 Bead
15 Depression
16 End
17 Bulging
18 Inner edge
19 Outer edge
20 Through-hole

The invention claimed is:
1. A connection of sheet metal components of a transmission, the connection, comprising:
at least one form fit between at least one first sheet metal component and at least one second sheet metal component, and at the same time the form fit being formed by at least one tenon projecting out of the first sheet metal component, the tenon having an outer contour including an externally conical portion, said tenon engaging into an orifice on the second sheet metal component, said orifice at least partially matching the outer contour of the tenon, wherein the tenon engages behind the second sheet metal component at least at an undercut of the second sheet metal component, and the sheet metal components are connected unreleasably to one another at the undercut, wherein the tenon is bushed out of the material of the first sheet metal component such that a depression is formed in the first sheet metal component on a rear side of the tenon which faces away from the second sheet metal component, and wherein the depression is of internally cylindrical design, an axis of symmetry of the depression being oriented in a direction in which the tenon projects, and at a same time the depression having an inside diameter which corresponds to 0.5 to 1.5 times a depth, codirectional with the axis of symmetry, of the depression.

2. The connection as claimed in claim 1, wherein the free end, penetrating into the orifice, of the tenon is expanded radially outward in the manner of a bead and at the same time engages axially behind the undercut.

3. The connection as claimed in claim 1, wherein the tenon is hollow on the inside.

4. The connection as claimed in claim 1, wherein the tenon engages behind an undercut formed in the orifice.

5. The connection as claimed in claim 1, wherein the depth of the depression is 0.3 to 0.9 times the wall thickness, codirectional with the axis of symmetry, of the first sheet metal component at the connection.

6. The connection as claimed in claim 1, wherein the depression has an inside diameter which corresponds to 0.75 to 1.5 times an overall wall thickness of sheet metal components lying one against the other at the connection, and at the same time the overall wall thickness being the sum, considered codirectionally with the axis of symmetry, of the wall thickness of the first sheet metal component and the wall thickness of the second sheet metal component.

7. The connection as claimed in claim 1, wherein the tenon and consequently the depression and also the undercut and a bead, engaging behind the undercut in the orifice, at the free end of the tenon are formed from portions of the sheet of the sheet metal components at the connection, the material of the portions having been displaced plastically, while the connection was being made, in one operation out of the sheet metal components lying one against the other.

8. The connection as claimed in claim 1, wherein the tenon and consequently the depression and also the undercut and a bead, engaging behind the undercut in the orifice, at the free end of the tenon are formed from portions of the sheet of the sheet metal components at the connection, the material of the portions having been displaced plastically, while the connection was being made, in one operation out of the sheet metal components lying one against the other, and in that the depression is designed to be internally cylindrically hollow and the tenon is designed to be hollow on the inside, the axis of symmetry of the depression being oriented in the direction in which the tenon projects, and the inside diameter of the depression being 1.8 to 8 times the largest free inner dimension of the tenon.

9. The connection as claimed in claim 1, wherein the tenon and consequently the depression and also the undercut and a bead, engaging behind the undercut in the orifice, at the free end of the tenon are formed from portions of the sheet of the sheet metal components at the connection, the material of the portions having been displaced plastically, while the connection was being made, in one operation out of the sheet metal components lying one against the other, and in that the depression is designed to be internally cylindrically hollow and the tenon is designed to be hollow on the inside, the axis of symmetry of the depression being oriented in the direction in which the tenon projects, and the tenon having inner dimensions which correspond to 0.2 to 0.8 times an overall wall thickness of the sheet metal components lying one against the other at the connection, and at the same time overall wall thickness being the sum, considered codirectionally with the axis of symmetry, of the wall thickness of the first sheet metal component and the wall thickness of the second sheet metal component.

10. The connection as claimed in claim 1, wherein the tenon and consequently the depression and also the undercut and a bead, engaging behind the undercut in the orifice, at the free end of the tenon are formed from portions of the sheet of the sheet metal components at the connection, the material of the portions having been displaced plastically, while the connection was being made, in one operation out of the sheet metal components lying one against the other, and in that the second sheet metal component has a bead formed from part of the plastically displaced material, the bead projecting out of the second sheet metal component after the undercut in a direction codirectional with the axis of symmetry.

11. The connection as claimed in claim 10, wherein a largest radial dimension and therefore outer dimension, directed transversely to the axis of symmetry, of the bead is 0.5 to 1.0 times the inside diameter of the depression.

12. A transmission having a connection as claimed in claim 1, wherein at least one of the sheet metal components is a planet carrier of a planetary drive.

13. The connection as claimed in claim 1, wherein the depression has a bottom surface on the rear side of the tenon, the bottom surface being perpendicular to the direction in which the tenon projects.

* * * * *